(12) United States Patent
Andersson et al.

(10) Patent No.: US 11,139,923 B2
(45) Date of Patent: Oct. 5, 2021

(54) CODE BLOCK GROUPS FOR RETRANSMISSIONS IN A WIRELESS COMMUNICATION SYSTEM

(71) Applicant: Telefonaktiebolaget LM Ericsson (publ), Stockholm (SE)

(72) Inventors: Mattias Andersson, Sundbyburg (SE); Yufei Blankenship, Kildeer, IL (US); Sara Sandberg, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/496,030

(22) PCT Filed: Mar. 23, 2018

(86) PCT No.: PCT/EP2018/057498
§ 371 (c)(1),
(2) Date: Sep. 20, 2019

(87) PCT Pub. No.: WO2018/172538
PCT Pub. Date: Sep. 27, 2018

(65) Prior Publication Data
US 2020/0028627 A1 Jan. 23, 2020

Related U.S. Application Data

(60) Provisional application No. 62/476,323, filed on Mar. 24, 2017.

(51) Int. Cl.
*H04L 1/18* (2006.01)
(52) U.S. Cl.
CPC .......... *H04L 1/1812* (2013.01); *H04L 1/1864* (2013.01); *H04L 1/1896* (2013.01)

(58) Field of Classification Search
CPC ... H04L 1/1812; H04L 1/1864; H04L 1/1896; H04L 1/1819; H04L 1/1621;
(Continued)

(56) References Cited

U.S. PATENT DOCUMENTS

2009/0313516 A1   12/2009   Shin et al.
2016/0226643 A1*  8/2016   Mallik .................. H04L 1/0089
(Continued)

OTHER PUBLICATIONS

Unknown, Author, "CRC Attachment for NR Data Channel", 3GPP TSG RAN WG1 Meeting #88bis, R1-1704310, Spokane, USA, Apr. 3-7, 2017, pp. 1-5.
(Continued)

*Primary Examiner* — Chi H Pham
*Assistant Examiner* — Ji-Hae Yea
(74) *Attorney, Agent, or Firm* — Murphy, Bilak & Homiller, PLLC

(57) ABSTRACT

A transmit radio node is configured to transmit one or more code blocks, CBs, of a transport block to a receive radio node. The transmit radio node is also configured to receive feedback from the receive radio node that positively or negatively acknowledges each of one or more first code block groups, CBGs, into which the one or more transmitted CBs are allocated according to a first CB-to-CBG allocation. The transmit radio node is further configured to re-transmit to the receive radio node any CBs that the first CB-to-CBG allocation allocates to one or more first CBGs which the feedback negatively acknowledged. Moreover, the transmit radio node is configured to receive feedback from the receive radio node that positively or negatively acknowledges each of one or more second CBGs into which the re-transmitted CBs are allocated according to a second CB-to-CBG allocation. The first and second CB-to-CBG allocations are different.

20 Claims, 9 Drawing Sheets

(58) Field of Classification Search
CPC ... H04L 1/1809; H04L 1/1854; H04L 1/1861; H04L 5/0055; H04L 5/00; H04L 1/18; H04L 1/00; H04L 1/0057; H04W 72/04; H04W 72/0446; H04W 72/0406
See application file for complete search history.

(56) References Cited

U.S. PATENT DOCUMENTS

2016/0233999 A1* 8/2016 Chendamarai Kannan ................ H04L 1/1861
2018/0145797 A1* 5/2018 Yeo ........................ H04L 1/1896

OTHER PUBLICATIONS

Unknown, Author, "RAN1 Chairman's Notes", 3GPP TSG RAN WG1 Meeting #88, Athens, Greece, Feb. 13-17, 2017, pp. 1-109.

* cited by examiner

| Transmission # | DCI Bitmap | CBs Included | gNB Detects Error in HARQ Feedback? | Incorrectly Decoded CBs | HARQ Feedback | CBG1 | CBG2 | CBG3 | CBG4 | CBG5 |
|---|---|---|---|---|---|---|---|---|---|---|
| 0 | Irrelevant | 0-99 | | | | 0-19 | 20-39 | 40-59 | 60-79 | 80-99 |
| 1 | 00101 | 40-59, 80-99 | No | 46, 82, 88, 92 | 11010 | | | 40-47, 48-55 | 56-69, 80-83 | 84-91 | 92-99 |
| 2 | 11111 | 40-59, 80-99 | Yes | 82, 88, 92 | 11000 | | | | | |
| | 11111 | | | None | 11111 | 40-47 | 48-55 | 56-69, 80-83 | 84-91 | 92-99 |

*FIG. 10A*

| Transmission # | DCI Bitmap | Allocation Counter | CBs Included | gNB Detects Error in HARQ Feedback? | Incorrectly Decoded CBs | HARQ Feedback | CBG1 | CBG2 | CBG3 | CBG4 | CBG5 |
|---|---|---|---|---|---|---|---|---|---|---|---|
| 0 | Irrelevant | 0 | 0-99 | | | | 0-19 | 20-39 | 40-59 | 60-79 | 80-99 |
| 1 | 00101 | 1 | 40-59, 80-99 | No | 46, 82, 88, 92 | 11010 | | | 40-47, 48-55 | 56-69, 80-83 | 84-91 | 92-99 |
| 2 | 00101 | 1 | 40-59, 80-99 | No | 82, 88, 92 | 11000 | | | | | |
| | | | | Yes | None | 11111 | 40-47 | 48-55 | 56-69, 80-83 | 84-91 | 92-99 |

*FIG. 10B*

CODE BLOCK GROUPS FOR RETRANSMISSIONS IN A WIRELESS COMMUNICATION SYSTEM

BACKGROUND

It has been decided in 3GPP that code block group (CBG)-based transmission with single/multi-bit HARQ-ACK feedback is supported in Rel-15. The CBG-based transmission only allows CBG-based (re)-transmission for the same transport block (TB) of a hybrid automatic repeat request (HARQ) process. A CBG can include all code blocks (CBs) of a TB regardless of the size of the TB. In such case, the UE reports a single HARQ acknowledgment (ACK) bit for the TB. However, a CBG can also include only one CB. Furthermore, it has been decided that the CBG granularity should be configurable.

The configurable number of HARQ feedback bits should give CBG-specific feedback on which CBGs were received successfully and which were not. This requires one HARQ feedback bit per CBG.

SUMMARY

One or more embodiments include a method performed by a transmit radio node configured for use in a wireless communication system. The method comprises transmitting one or more code blocks (CBs) of a transport block to a receive radio node. The method also comprises receiving feedback from the receive radio node that positively or negatively acknowledges each of one or more first code block groups (CBGs) into which the one or more transmitted CBs are allocated according to a first CB-to-CBG allocation. The method further comprises re-transmitting to the receive radio node any CBs that the first CB-to-CBG allocation allocates to one or more first CBGs which the feedback negatively acknowledged. The method also comprises receiving feedback from the receive radio node that positively or negatively acknowledges each of one or more second CBGs into which the re-transmitted CBs are allocated according to a second CB-to-CBG allocation, wherein the first and second CB-to-CBG allocations are different.

In some embodiments, the second CB-to-CBG allocation allocates fewer CBs to the second CBGs than the first CB-to-CBG allocation allocates to the first CBGs.

Alternatively or additionally, the feedback includes a number of acknowledgement bits that is equal to a number of first or second CBGs to be positively or negatively acknowledged by that feedback.

In some embodiments, the feedback includes one or more acknowledgement bits, with each acknowledgement bit positively or negatively acknowledging a respective first or second CBG.

In some embodiments, the method further comprises transmitting signaling to the receive radio node indicating a number of first or second CBGs into which CBs are allocated according to the first or second CB-to-CBG allocation.

In some embodiments, the method further comprises transmitting signaling to the receive radio node indicating a number of bits to be included in feedback to be received from the receive radio node that positively or negatively acknowledges each of the one or more first or second CBGs.

In some embodiments, the method further comprises calculating, as a function of a number of the CBs that are re-transmitted or a number of information bits corresponding to the CBs that are re-transmitted, a number of bits to be included in feedback to be received from the receive radio node that positively or negatively acknowledges each of the one or more second CBGs.

In some embodiments, the method further comprises determining the first CB-to-CBG allocation as a function of the number of first CBGs and a number of CBs in the transport block, and/or determining the second CB-to-CBG allocation as a function of the number of second CBGs and a number of re-transmitted CBs.

In some embodiments, re-transmitting a given CB comprises transmitting a redundancy version of the given CB that is different than a previously transmitted redundancy version of the given CB.

In some embodiments, the method further comprises attaching a cyclic redundancy check (CRC) to each CB. In other embodiments, the method further comprises attaching a cyclic redundancy check (CRC) to each set of multiple CBs. In one such embodiment, the first or second CB-to-CBG allocation allocates more CBs to each first or second CBG than a number of CBs included in each set of CBs to which a CRC is attached.

In some embodiments, the method further comprises transmitting signaling to the receive radio node indicating according to which CB-to-CBG allocation CBs are to be, or are expected to be, allocated to CBGs.

In some embodiments, the signaling comprises a counter field whose value is incremented each time a CB-to-CBG allocation according to which CBs are to be, or are expected to be, allocated changes.

In some embodiments, the signaling comprises a reset field whose value indicates whether or not the transmit radio node has reverted to a previously used CB-to-CBG allocation according to which CBs are to be, or are expected to be, allocated to CBGs.

In some embodiments, the method further comprises reverting to a previously used CB-to-CBG allocation according to which CBs are to be, or are expected to be, allocated to CBGs, responsive to deeming received feedback from the receive radio node unreliable.

In some embodiments, the method further comprises transmitting signaling indicating into which of the one or more first CBGs the re-transmitted CBs are allocated according to the first CB-to-CBG allocation. In one embodiment, for example, the signaling comprises downlink control information (DCI). Alternatively or additionally, the signaling includes one or more bits, with each bit indicating whether any of the re-transmitted CBs are allocated into a respective one of the first CBGs according to the first CB-to-CBG allocation.

Some embodiments further include a method performed by a receive radio node configured for use in a wireless communication system. The method comprises receiving one or more code blocks (CBs) of a transport block from a transmit radio node. The method also comprises transmitting feedback to the transmit radio node that positively or negatively acknowledges each of one or more first code block groups (CBGs) into which the one or more transmitted CBs are allocated according to a first CB-to-CBG allocation. The method further comprises receiving from the transmit radio node re-transmission of any CBs that the first CB-to-CBG allocation allocates to one or more first CBGs which the feedback negatively acknowledged. The method also comprises transmitting feedback to the transmit radio node that positively or negatively acknowledges each of one or more second CBGs into which the re-transmitted CBs are allocated according to a second CB-to-CBG allocation, wherein the first and second CB-to-CBG allocations are different.

In some embodiments, the second CB-to-CBG allocation allocates fewer CBs to the second CBGs than the first CB-to-CBG allocation allocates to the first CBGs.

Alternatively or additionally, the feedback in some embodiments includes a number of acknowledgement bits that is equal to a number of first or second CBGs to be positively or negatively acknowledged by that feedback.

In some embodiments, the feedback includes one or more acknowledgement bits, with each acknowledgement bit positively or negatively acknowledging a respective first or second CBG.

In some embodiments, the method further comprises receiving from the transmit radio node signaling indicating a number of first or second CBGs into which CBs are allocated according to the first or second CB-to-CBG allocation.

In some embodiments, the method further comprises receiving from the transmit radio node signaling node indicating a number of bits to be included in feedback to be transmitted to the transmit radio node that positively or negatively acknowledges each of the one or more first or second CBGs.

In some embodiments, the method further comprises calculating, as a function of a number of the CBs that are re-transmitted or a number of information bits corresponding to the CBs that are re-transmitted, a number of bits to be included in feedback to be transmitted to the transmit radio node that positively or negatively acknowledges each of the one or more second CBGs.

In some embodiments, the method further comprises determining the first CB-to-CBG allocation as a function of the number of first CBGs and a number of CBs in the transport block, and/or determining the second CB-to-CBG allocation as a function of the number of second CBGs and a number of re-transmitted CBs.

In some embodiments, receiving re-transmission of a given CB comprises receiving a redundancy version of the given CB that is different than a previously received redundancy version of the given CB.

In some embodiments, the method further comprises detecting whether each CB is received in error using a cyclic redundancy check (CRC) attached to each CB. In other embodiments, the method further comprises detecting whether each set of multiple CBs is received in error using a cyclic redundancy check (CRC) attached to each set of multiple CBs, and wherein the first or second CB-to-CBG allocation allocates more CBs to each first or second CBG than a number of CBs included in each set of CBs to which a CRC is attached.

In some embodiments, the method further comprises receiving from the transmit radio node signaling indicating according to which CB-to-CBG allocation CBs are to be, or are expected to be, allocated to CBGs. In one embodiment, for example, the signaling comprises a counter field whose value is incremented each time a CB-to-CBG allocation according to which CBs are to be, or are expected to be, allocated changes. In other embodiments, the signaling comprises a reset field whose value indicates whether or not the transmit radio node has reverted to a previously used CB-to-CBG allocation according to which CBs are to be, or are expected to be, allocated to CBGs.

In some embodiments, the method further comprises reverting to a previously used CB-to-CBG allocation according to which CBs are to be, or are expected to be, allocated to CBGs, responsive to determining that the transmit radio node did not correctly receive feedback from the receive radio node.

In some embodiments, the method further comprises receiving signaling indicating into which of the one or more first CBGs the re-transmitted CBs are allocated according to the first CB-to-CBG allocation. For example, in one embodiment, the signaling comprises downlink control information (DCI). Alternatively or additionally, the signaling in some embodiments includes one or more bits, with each bit indicating whether any of the re-transmitted CBs are allocated into a respective one of the first CBGs according to the first CB-to-CBG allocation.

In some embodiments, the method further comprises combining information (e.g., soft information) from the one or more received CBs with information (e.g., soft information) from the re-transmitted CBs. In one embodiment, for example, the combining is performed before decoding the re-transmitted CBs.

In some embodiments, the method further comprises decoding only those of the re-transmitted CBs that prompted negative acknowledgement of one or more of the first CBGs.

Embodiments also include corresponding apparatus, computer programs, carriers, and computer readable mediums.

By allowing dynamic re-allocation of CBs to CBGs, one or more embodiments make sure that the number of CBGs may be the same as the number of HARQ feedback bits. Since the CBGs of a retransmission typically contain fewer CBs than in the original transmission, erroneously received CBGs that must be retransmitted with a second retransmission contain fewer bits and require less resources for retransmission.

Since soft information from the first transmissions are stored and soft combined with soft information from possible retransmissions, it is important that the CBs are the same in all transmissions. Some embodiments therefore propose that CRC bits are attached to each CB, e.g., for use in CBG-based acknowledgement feedback. In some of these embodiments, CRC may not be attached to CBGs.

By keeping the CBGs small in some embodiments, the resources required for retransmission of a specific CBG are also small, since fewer correctly received CBs are retransmitted.

In some embodiments, CRC bits are only attached on CB level, not on CBG level. This allows for soft combining of information from transmissions with varying allocation of CBs to CBGs.

DETAILED DESCRIPTION

Figure 1:
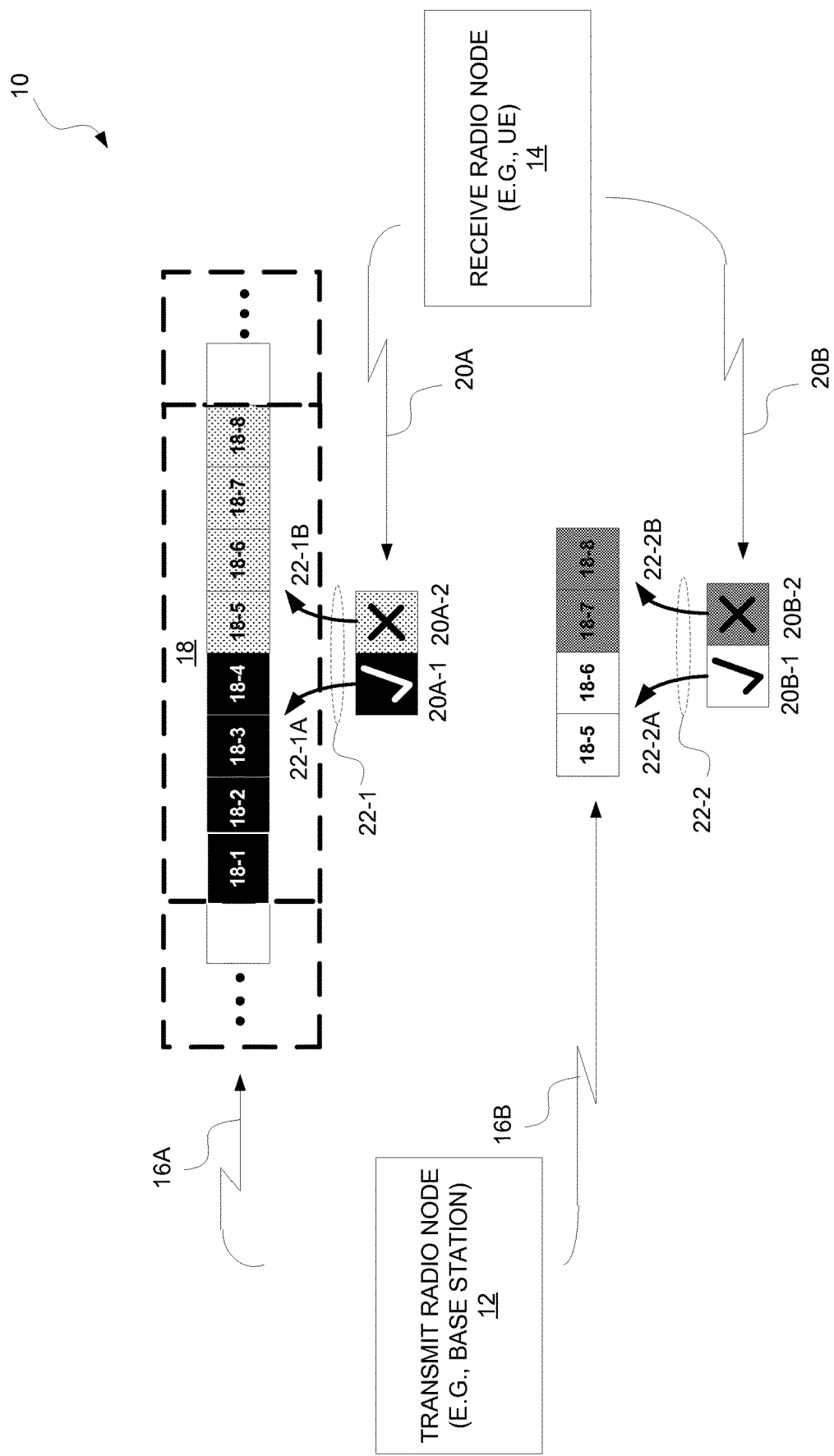
FIG. 1 is a block diagram of a wireless communication system that includes a transmit radio node and a receive radio node according to some embodiments.

FIG. 1 shows a wireless communication system 10 according to some embodiments. The system 10 includes a transmit radio node 12 (e.g., a base station) and a receive radio node 14 (e.g., a user equipment, UE).

The transmit radio node 12 as shown, e.g., via a first transmission 16A, transmits one or more code blocks (CBs) 18-1, . . . 18-8 of a transport block 18 to the receive radio node 14. This transport block 18 may be for instance the unit of data transmission in the physical layer of the system 10, and each code block may be a block of data which is the input to a channel encoder for channel coding (e.g., turbo coding).

The receive radio node 14 in turn transmits feedback 20A to the transmit radio node 12. This feedback 20A positively or negatively acknowledges each of one or more first code block groups (CBGs) into which the one or more transmitted CBs 18-1 . . . 18-8 are allocated according to a first CB-to-CBG allocation 22-1. Each CBG may for instance include one or more CBs, such that acknowledgement is CBG-based as opposed to necessarily being CB-based or TB-based. If any CB allocated to a particular CBG is erroneously received, that particular CBG is negatively acknowledged. Only if all CBs allocated to a particular CBG are correctly received will that particular CBG be positively acknowledged.

As shown, for instance, the first CB-to-CBG allocation 22-1 allocates CBs 18-1, 18-2, 18-3, and 18-4 to first CBG 22-1A and allocates CBs 18-5, 18-6, 18-7, and 18-8 to first CBG 22-1B. The feedback 20A positively acknowledges first CBG 22-1A based on the receive radio node 14 correctly receiving all of CBs 18-1, 18-2, 18-3, and 18-4. But the feedback 20A negatively acknowledges first CBG 22-1B based on the receive radio node 14 erroneously receiving at least one of CB 18-5, 18-6, 18-7, and 18-8. In FIG. 1, the feedback 20A includes a number of acknowledgement bits that is equal to a number of first CBGs to be positively or negatively acknowledged by that feedback 20A; that is, the feedback 20A includes 2 bits 20A-1 and 20A-2 to acknowledge the 2 first CBGs 22-1A and 22-1B. Each acknowledgement bit as shown positively or negatively acknowledging a respective first CBG.

Based on this feedback 20A, the transmit radio node 12, e.g., via transmission 16B, re-transmits to the receive radio node 14 any CBs that the first CB-to-CBG allocation 22-1 allocates to one or more first CBGs which the feedback 20A negatively acknowledged. Accordingly, as shown in FIG. 1, the transmit radio node 12 re-transmits CBs 18-5, 18-6, 18-7, and 18-8 because those are the CBs that the first CB-to-CBG allocation 22-1 allocates to first CBG 22-1B, which the feedback 20A negatively acknowledged. The transmit radio node 12 does not re-transmit other CBs since they are allocated to positively acknowledged first CB 22-1A. Note that, in at least some embodiments, re-transmitting a given CB means transmitting a redundancy version of the given CB that is different than a previously transmitted redundancy version of the given CB (i.e., different sets of coded bits for the given CB may be transmitted across different transmissions of that given CB).

The receive radio node 14 in turn transmits feedback 20B to the transmit radio node 12. This feedback 20B positively or negatively acknowledges each of one or more second code block groups (CBGs) into which the one or more re-transmitted CBs 18-5 . . . 18-8 are allocated according to a second CB-to-CBG allocation 22-2. In FIG. 1, the feedback 20B similarly includes a number of acknowledgement bits that is equal to a number of second CBGs to be positively or negatively acknowledged by that feedback 20B; that is, the feedback 20B includes 2 bits 20B-1 and 20B-2 to acknowledge the 2 second CBGs 22-2A and 22-2B. Each acknowledgement bit as shown positively or negatively acknowledging a respective second CBG.

Notably, the second CB-to-CBG allocation 22-2 is different than the first CB-to-CBG allocation 22-1. The first and second allocations 22-1, 22-2 in this regard may be different in that they allocate CBs to different numbers of groups, may allocate CBs to groups of different sizes, may allocate at least one CB to different groups, may allocate different numbers of CBs, or the like.

In some embodiments, for example, the first and second allocations 22-1, 22-2 are different in that the second CB-to-CBG allocation 22-2 allocates fewer CBs to one or more of the second CBGs than the first CB-to-CBG allocation 22-1 allocates to one or more of the first CBGs. As shown in FIG. 1, for instance, the second CB-to-CBG allocation 22-2 allocates only 2 CBs to each second CBG 22-2A, 22-2B whereas the first CB-to-CBG allocation 22-1 allocated 4 CBs to each first CBG 22-1A, 22-1B. In some embodiments, the first and second CB-to-CBG allocations 22-1, 22-2 are defined in this way so as to provide progressively finer-grained CBG-based acknowledgement feedback across (re-)transmissions of CBs of a transport block. With progressively finer-grained acknowledgement feedback, the CBG size decreases from (re-) transmission to (re-)transmission.

Figure 2:
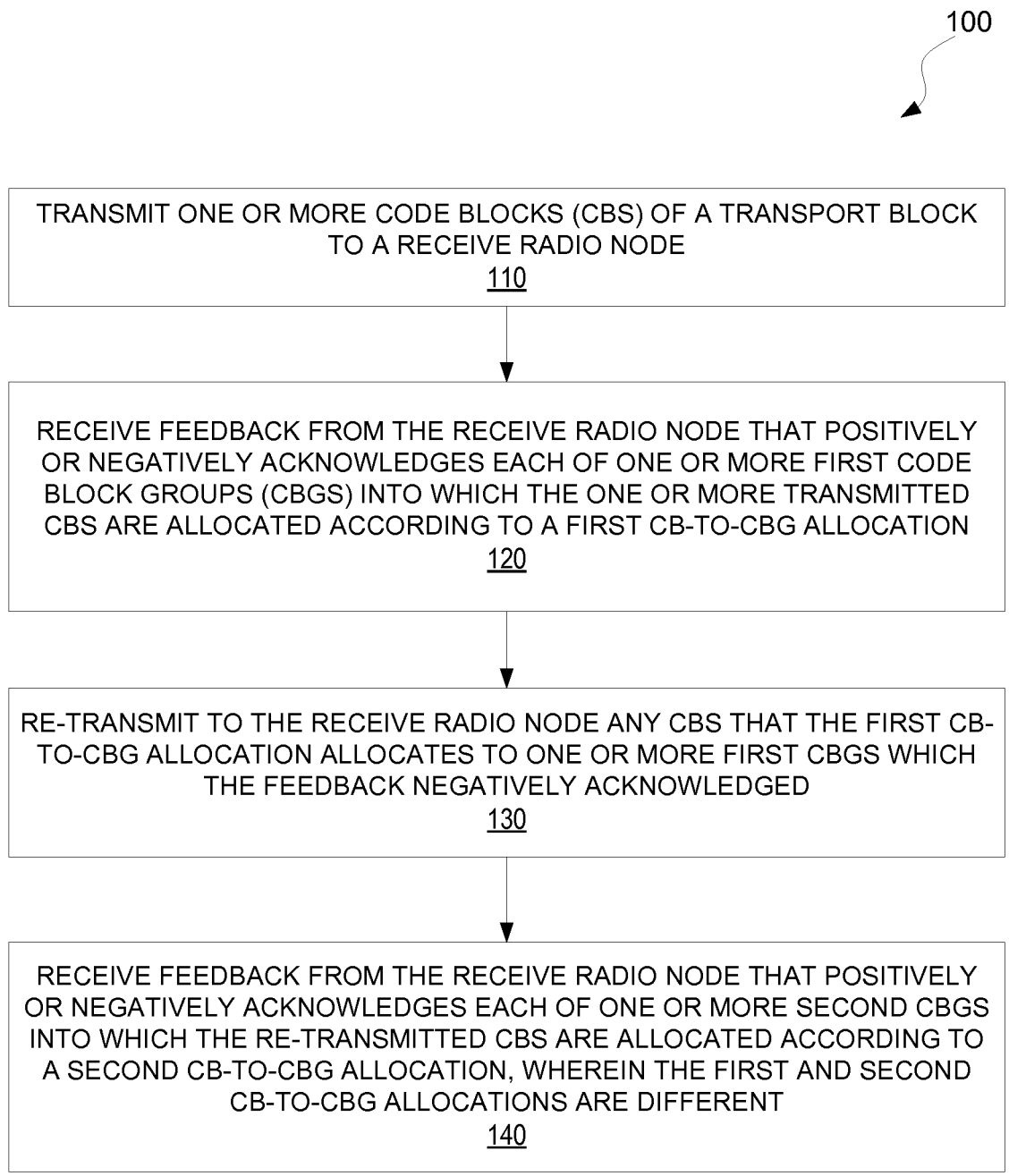
FIG. 2 is a logic flow diagram of a method performed by a transmit radio node according to some embodiments.

In view of the above, FIG. 2 illustrates a method 100 performed by a transmit radio node 12 according to some embodiments herein. As shown, the method 100 includes transmitting one or more code blocks (CBs) of a transport block 18 to a receive radio node 14 (Block 110). The method 100 also includes receiving feedback 20A from the receive radio node 12 that positively or negatively acknowledges each of one or more first code block groups (CBGs) into which the one or more transmitted CBs are allocated according to a first CB-to-CBG allocation 22-1 (Block 120). The method 100 further includes re-transmitting to the receive radio node 14 any CBs that the first CB-to-CBG allocation 22-1 allocates to one or more first CBGs which the feedback 20A negatively acknowledged (Block 130). The method also includes receiving feedback 20B from the receive radio node 14 that positively or negatively acknowledges each of one or more second CBGs into which the re-transmitted CBs are allocated according to a second CB-to-CBG allocation 22-2, wherein the first and second CB-to-CBG allocations 22-1, 22-2 are different (Block 140).

In some embodiments, the second CB-to-CBG allocation allocates fewer CBs to each second CBG than the first CB-to-CBG allocation allocates to each first CBG. Alternatively or additionally, the second CB-to-CBG allocation in some embodiments allocates fewer CBs to one or more of the second CBGs than the first CB-to-CBG allocation allocates to one or more of the first CBGs.

Alternatively or additionally, the feedback includes a number of acknowledgement bits that is equal to a number of first or second CBGs to be positively or negatively acknowledged by that feedback.

In some embodiments, the feedback includes one or more acknowledgement bits, with each acknowledgement bit positively or negatively acknowledging a respective first or second CBG.

In some embodiments, the method further comprises transmitting signaling to the receive radio node indicating a number of first or second CBGs into which CBs are allocated according to the first or second CB-to-CBG allocation.

In some embodiments, the method further comprises transmitting signaling to the receive radio node indicating a number of bits to be included in feedback to be received from the receive radio node that positively or negatively acknowledges each of the one or more first or second CBGs.

In some embodiments, the method further comprises calculating, as a function of a number of the CBs that are re-transmitted or a number of information bits corresponding to the CBs that are re-transmitted, a number of bits to be included in feedback to be received from the receive radio node that positively or negatively acknowledges each of the one or more second CBGs.

In some embodiments, the method further comprises determining the first CB-to-CBG allocation as a function of the number of first CBGs and a number of CBs in the transport block, and/or determining the second CB-to-CBG allocation as a function of the number of second CBGs and a number of re-transmitted CBs.

In some embodiments, re-transmitting a given CB comprises transmitting a redundancy version of the given CB that is different than a previously transmitted redundancy version of the given CB.

In some embodiments, the method further comprises attaching a cyclic redundancy check (CRC) to each CB. In other embodiments, the method further comprises attaching a cyclic redundancy check (CRC) to each set of multiple CBs. In one such embodiment, the first or second CB-to-CBG allocation allocates more CBs to each first or second CBG than a number of CBs included in each set of CBs to which a CRC is attached. Alternatively or additionally, the first or second CB-to-CBG allocation in some embodiments allocates more CBs to a first or second CBG than a number of CBs included in each set of CBs to which a CRC is attached.

In some embodiments, the method further comprises transmitting signaling to the receive radio node indicating according to which CB-to-CBG allocation CBs are to be, or are expected to be, allocated to CBGs.

In some embodiments, the signaling comprises a counter field whose value is incremented each time a CB-to-CBG allocation according to which CBs are to be, or are expected to be, allocated changes.

In some embodiments, the signaling comprises a reset field whose value indicates whether or not the transmit radio node has reverted to a previously used CB-to-CBG allocation according to which CBs are to be, or are expected to be, allocated to CBGs.

In some embodiments, the method further comprises reverting to a previously used CB-to-CBG allocation according to which CBs are to be, or are expected to be, allocated to CBGs, responsive to deeming received feedback from the receive radio node unreliable.

In some embodiments, the method further comprises transmitting signaling indicating into which of the one or more first CBGs the re-transmitted CBs are allocated according to the first CB-to-CBG allocation. In one embodiment, for example, the signaling comprises downlink control information (DCI). Alternatively or additionally, the signaling includes one or more bits, with each bit indicating whether any of the re-transmitted CBs are allocated into a respective one of the first CBGs according to the first CB-to-CBG allocation.

Figure 3:
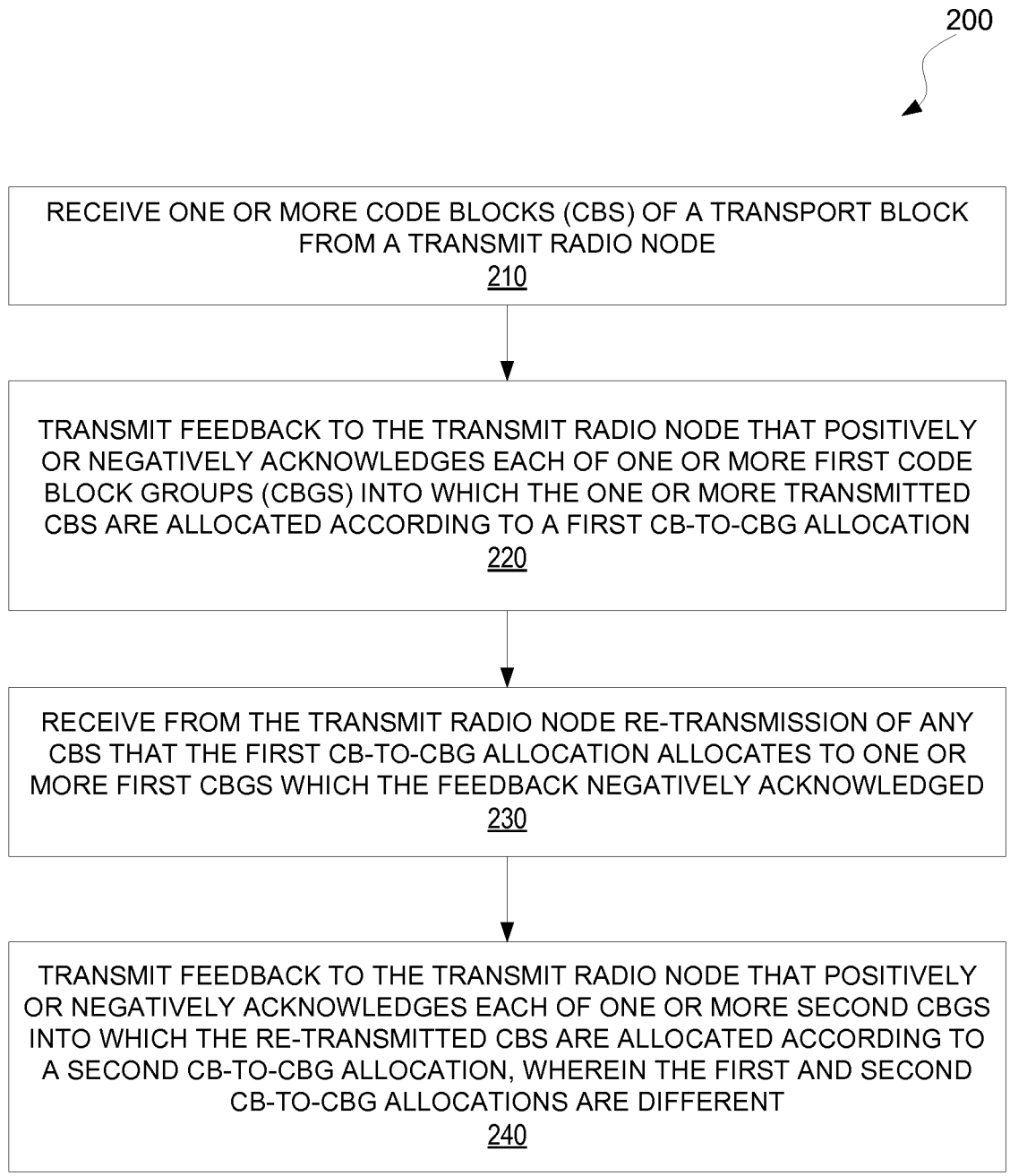
FIG. 3 is a logic flow diagram of a method performed by a receive radio node according to some embodiments.

FIG. 3 illustrates a corresponding method 200 performed by a receive radio node 14 configured for use in a wireless communication system according to some embodiments. As shown, the method 200 includes receiving one or more code blocks (CBs) of a transport block 18 from a transmit radio node 12 (Block 210). The method 200 also includes transmitting feedback 20A to the transmit radio node 12 that positively or negatively acknowledges each of one or more first code block groups (CBGs) into which the one or more transmitted CBs are allocated according to a first CB-to-CBG allocation 22-1 (Block 220). The method 200 further includes receiving from the transmit radio node 12 re-transmission of any CBs that the first CB-to-CBG allocation 22-1 allocates to one or more first CBGs which the feedback 20A negatively acknowledged (Block 230). The method 200 also includes transmitting feedback 20B to the transmit radio node 12 that positively or negatively acknowledges each of one or more second CBGs into which the re-transmitted CBs are allocated according to a second CB-to-CBG allocation 22-2, wherein the first and second CB-to-CBG allocations 22-1, 22-2 are different (Bock 240).

In some embodiments, the second CB-to-CBG allocation allocates fewer CBs to each second CBG than the first CB-to-CBG allocation allocates to each first CBG. Alternatively or additionally, the second CB-to-CBG allocation allocates fewer CBs to one or more of the second CBGs than the first CB-to-CBG allocation allocates to one or more of the first CBGs.

Alternatively or additionally, the feedback in some embodiments includes a number of acknowledgement bits that is equal to a number of first or second CBGs to be positively or negatively acknowledged by that feedback.

In some embodiments, the feedback includes one or more acknowledgement bits, with each acknowledgement bit positively or negatively acknowledging a respective first or second CBG.

In some embodiments, the method further comprises receiving from the transmit radio node signaling indicating a number of first or second CBGs into which CBs are allocated according to the first or second CB-to-CBG allocation.

In some embodiments, the method further comprises receiving from the transmit radio node signaling node indicating a number of bits to be included in feedback to be transmitted to the transmit radio node that positively or negatively acknowledges each of the one or more first or second CBGs.

In some embodiments, the method further comprises calculating, as a function of a number of the CBs that are re-transmitted or a number of information bits corresponding to the CBs that are re-transmitted, a number of bits to be included in feedback to be transmitted to the transmit radio node that positively or negatively acknowledges each of the one or more second CBGs.

In some embodiments, the method further comprises determining the first CB-to-CBG allocation as a function of the number of first CBGs and a number of CBs in the transport block, and/or determining the second CB-to-CBG allocation as a function of the number of second CBGs and a number of re-transmitted CBs.

In some embodiments, receiving re-transmission of a given CB comprises receiving a redundancy version of the given CB that is different than a previously received redundancy version of the given CB.

In some embodiments, the method further comprises detecting whether each CB is received in error using a cyclic redundancy check (CRC) attached to each CB. In other embodiments, the method further comprises detecting whether each set of multiple CBs is received in error using a cyclic redundancy check (CRC) attached to each set of multiple CBs, and wherein the first or second CB-to-CBG allocation allocates more CBs to each first or second CBG than a number of CBs included in each set of CBs to which a CRC is attached. Alternatively or additionally, the first or second CB-to-CBG allocation in some embodiments allocates more CBs to a first or second CBG than a number of CBs included in each set of CBs to which a CRC is attached.

In some embodiments, the method further comprises receiving from the transmit radio node signaling indicating according to which CB-to-CBG allocation CBs are to be, or are expected to be, allocated to CBGs. In one embodiment, for example, the signaling comprises a counter field whose value is incremented each time a CB-to-CBG allocation according to which CBs are to be, or are expected to be, allocated changes. In other embodiments, the signaling comprises a reset field whose value indicates whether or not the transmit radio node has reverted to a previously used CB-to-CBG allocation according to which CBs are to be, or are expected to be, allocated to CBGs.

In some embodiments, the method further comprises reverting to a previously used CB-to-CBG allocation according to which CBs are to be, or are expected to be, allocated to CBGs, responsive to determining that the transmit radio node did not correctly receive feedback from the receive radio node.

In some embodiments, the method further comprises receiving signaling indicating into which of the one or more first CBGs the re-transmitted CBs are allocated according to the first CB-to-CBG allocation. For example, in one embodiment, the signaling comprises downlink control information (DCI). Alternatively or additionally, the signaling in some embodiments includes one or more bits, with each bit indicating whether any of the re-transmitted CBs are allocated into a respective one of the first CBGs according to the first CB-to-CBG allocation.

In some embodiments, the method further comprises soft combining soft information from the one or more received CBs with soft information from the re-transmitted CBs. In one embodiment, for example, said soft combining is performed before decoding the re-transmitted CBs.

In some embodiments, the method further comprises decoding only those of the re-transmitted CBs that prompted negative acknowledgement of one or more of the first CBGs.

Figure 4:
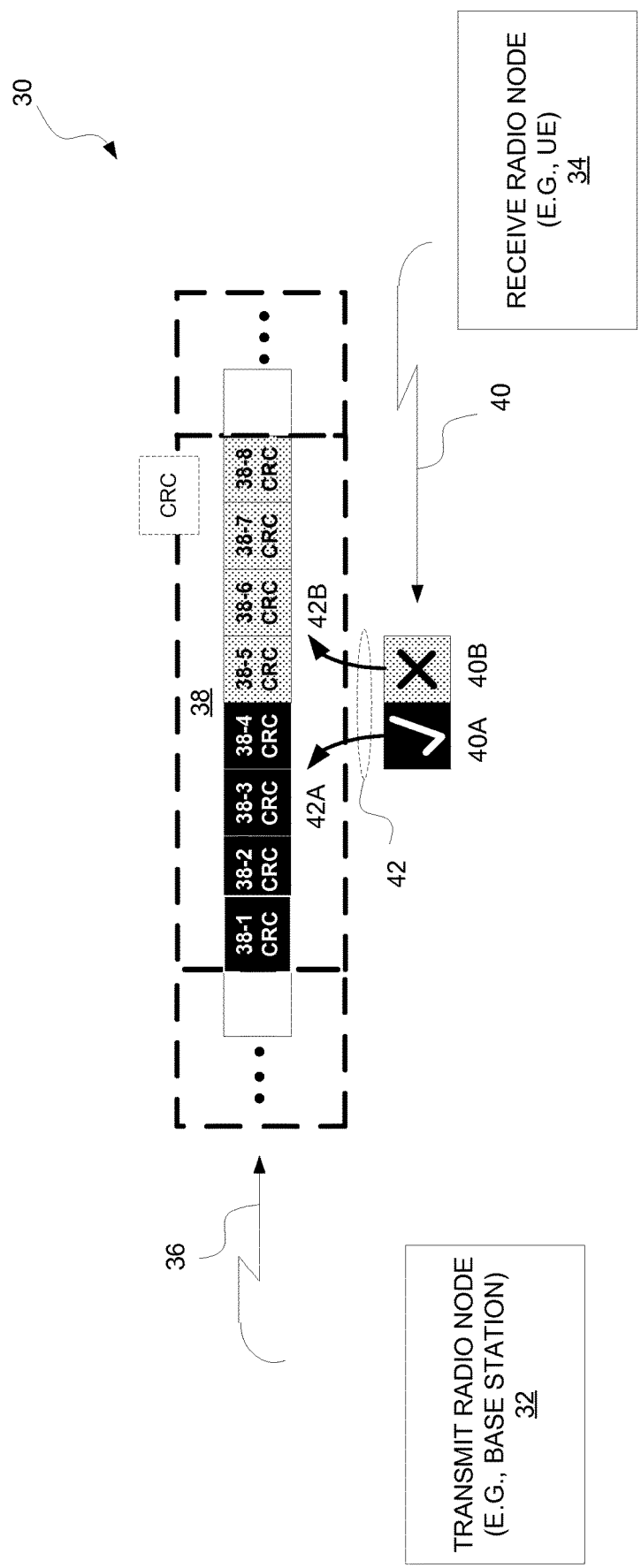
FIG. 4 is a block diagram of a wireless communication system that includes a transmit radio node and a receive radio node according to other embodiments.

FIG. 4 shows a wireless communication system 30 according to still other embodiments. The system 30 includes a transmit radio node 32 (e.g., a base station) and a receive radio node 34 (e.g., a user equipment, UE).

The transmit radio node 32 as shown, e.g., via a first transmission 36, transmits one or more code blocks (CBs) 38-1, . . . 38-8 of a transport block 38 to the receive radio node 34. This transport block 38 may be for instance the unit of data transmission in the physical layer of the system 30, and each code block may be a block of data which is the input to a channel encoder for channel coding (e.g., turbo coding).

The receive radio node 34 in turn transmits feedback 40 to the transmit radio node 32. This feedback 40 positively or negatively acknowledges each of one or more first code block groups (CBGs) into which the one or more transmitted CBs 38-1 . . . 38-8 are allocated, e.g., according to a CB-to-CBG allocation 42. Each CBG may for instance include one or more CBs, such that acknowledgement is CBG-based as opposed to necessarily being CB-based or TB-based. If any CB allocated to a particular CBG is erroneously received, that particular CBG is negatively acknowledged. Only if all CBs allocated to a particular CBG are correctly received will that particular CBG be positively acknowledged.

As shown, for instance, the CB-to-CBG allocation 42 allocates CBs 38-1, 38-2, 38-3, and 38-4 to CBG 42A and allocates CBs 38-5, 38-6, 38-7, and 38-8 to CBG 42B. The feedback 40 positively acknowledges CBG 42A based on the receive radio node 34 correctly receiving all of CBs 38-1, 38-2, 38-3, and 38-4. But the feedback 40 negatively acknowledges CBG 42B based on the receive radio node 34 erroneously receiving at least one of CB 38-5, 38-6, 38-7, and 38-8. In FIG. 4, the feedback 40 includes a number of acknowledgement bits that is equal to a number of CBGs to be positively or negatively acknowledged by that feedback 40; that is, the feedback 40 includes 2 bits 40A and 40B to acknowledge the 2 CBGs 42A and 42B. Each acknowledgement bit as shown positively or negatively acknowledging a respective CBG.

Notably, FIG. 4 shows that a cyclic redundancy check (CRC) is attached to each CB according to some embodiments. The receive radio node 34 checks the CRC attached to each CB in order to check whether each CB was correctly received and to correspondingly generate the CBG-based feedback 40. This use of the CRC attached to each CB may contrast for instance with use of the CRC for early termination of decoding the CBs in the transport block 38; that is, the CRCs may be used to generate CBG-based acknowledgement feedback 40 rather than transport block based acknowledgement feedback.

Note that although FIG. 4 shows a CRC attached to each CB, other embodiments attach a CRC to each set of multiple CBs. In one or more of these embodiments, more CBs are allocated to each CBG than a number of CBs included in each set of CBs to which a CRC is attached.

Figure 5:
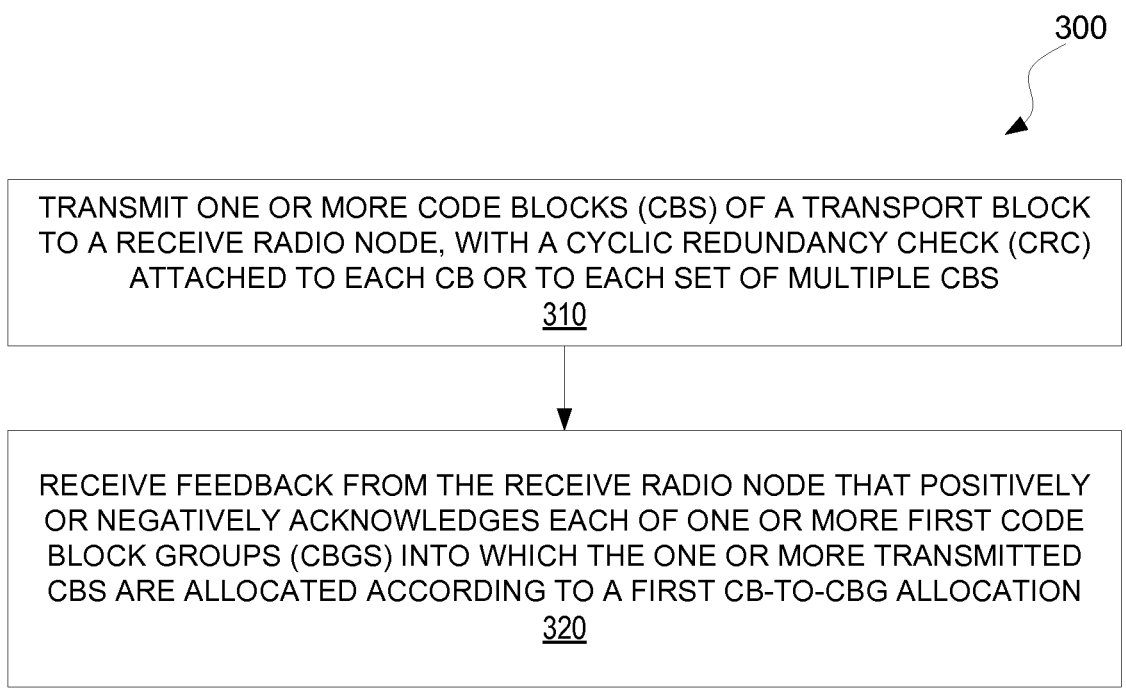
FIG. 5 is a logic flow diagram of a method performed by a transmit radio node according to other embodiments.

In view of the above, FIG. 5 illustrates a method 300 performed by a transmit radio node 32 configured for use in a wireless communication system 30 according to some embodiments. As shown, the method 300 includes transmitting one or more code blocks (CBs) of a transport block to a receive radio node 34, with a cyclic redundancy check (CRC) attached to each CB or to each set of multiple CBs (Block 310). The method 300 also includes receiving feedback 40 from the receive radio node 34 that positively or negatively acknowledges each of one or more code block groups (CBGs) into which the one or more transmitted CBs are allocated (Block 320). In some embodiments, positive or negative acknowledgement of each CBG is based on checking the CRC attached to each CB or each set of multiple CBs allocated to that CBG.

Figure 6:
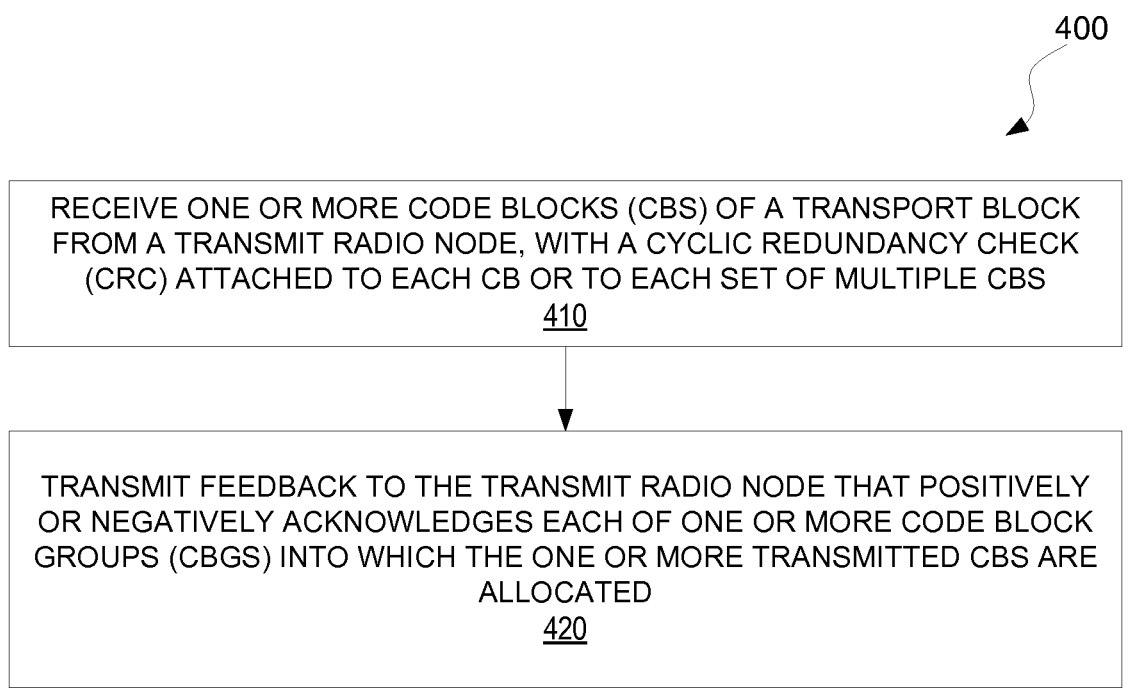
FIG. 6 is a logic flow diagram of a method performed by a receive radio node according to other embodiments.

FIG. 6 illustrates a corresponding method 400 performed by a receive radio node 34 configured for use in a wireless communication system 30 according to some embodiments. As shown, the method 400 includes receiving one or more code blocks (CBs) of a transport block from a transmit radio node 32, with a cyclic redundancy check (CRC) attached to each CB or to each set of multiple CBs (Block 410). The method 400 also includes transmitting feedback 40 to the transmit radio node 32 that positively or negatively acknowledges each of one or more code block groups (CBGs) into which the one or more transmitted CBs are allocated (Block 420). In some embodiments, positive or negative acknowledgement of each CBG is based on checking the CRC attached to each CB or each set of multiple CBs allocated to that CBG.

Note that a transmit radio node herein may be any type of radio node that transmits the one or more CBs of a transport block as described herein, and a receive radio node herein may be any type of radio node that receives those one or more CBs. Although exemplified in FIG. 1 as being a base station and a UE respectively, the converse may also be true.

Despite explanation in the context of Long Term Evolution (LTE) and 5G in some embodiments, it will be appreciated that the techniques may be applied to other wireless networks. Thus, references herein to signals using terminology from the 3GPP standards should be understood to apply more generally to signals having similar characteristics and/or purposes, in other networks.

A radio node herein is any type of node capable of communicating over radio signals. A radio network node herein is any type of network node (e.g., a base station) capable of communicating with another node over radio signals. A user equipment is any type device capable of communicating with a radio network node or another user equipment over radio signals. A user equipment may therefore refer to a machine-to-machine (M2M) device, a machine-type communications (MTC) device, a NB-IoT device, etc. A user equipment may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. It should be understood that these devices may be UEs, but are generally configured to transmit and/or receive data without direct human interaction.

In an IOT scenario, a user equipment as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a user equipment as described herein may be comprised in a vehicle and may perform monitoring and/or reporting of the vehicle's operational status or other functions associated with the vehicle.

Note that a transmit radio node 12, 32 may perform the processing herein by implementing any functional means or units. In one embodiment, for example, the transmit radio node 12, 32 comprises respective circuits configured to perform processing herein, e.g., the steps shown in any of FIGS. 2 and 5. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein.

Figure 7B:
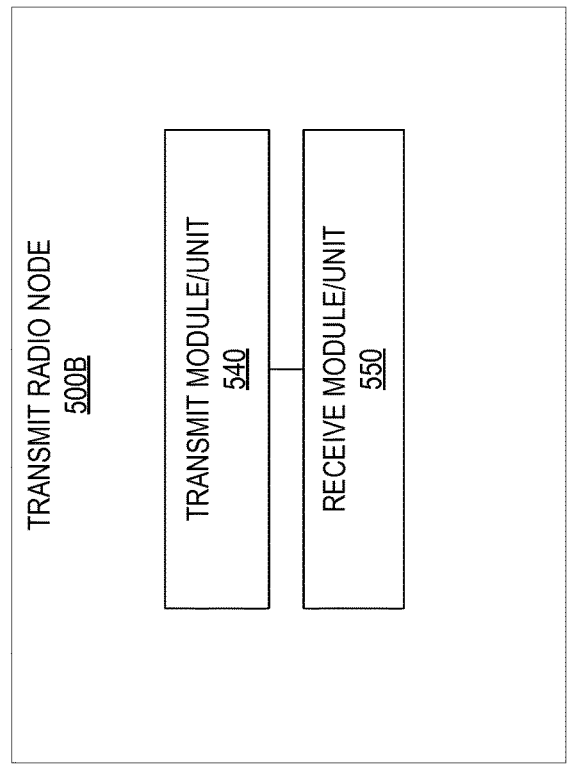
FIG. 7B is a block diagram of a transmit radio node according to some embodiments.
Figure 7A:
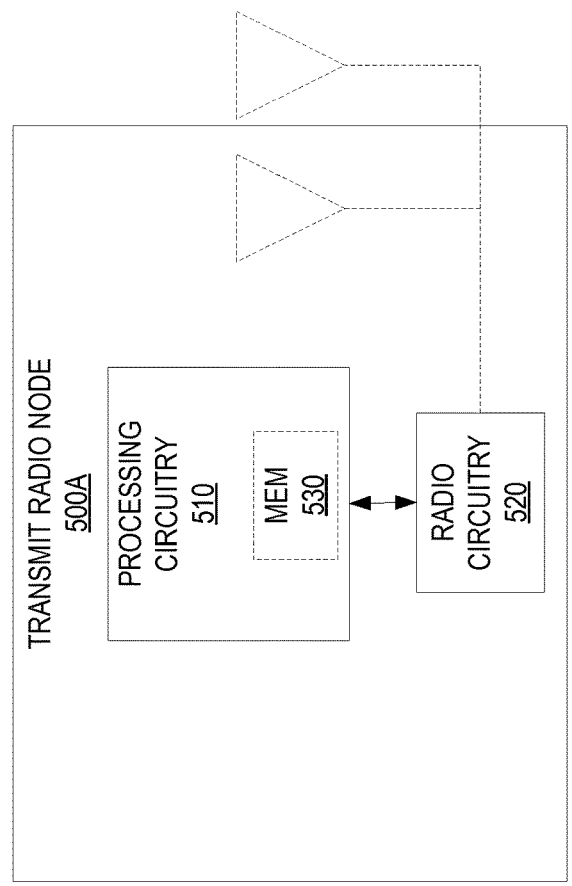
FIG. 7A is a block diagram of a transmit radio node according to some embodiments.

FIG. 7A illustrates additional details of a transmit radio node 12, 32 in accordance with one or more embodiments, shown generally as transmit radio node 500A. As shown, the transmit radio node 500A includes processing circuitry 510 and radio circuitry 520. The radio circuitry 520 may be configured to transmit and/or receive via one or more antennas that are internal and/or external to the transmit radio node 500A. The processing circuitry 510 is configured to perform processing described above, e.g., in FIGS. 2 and/or 5, such as by executing instructions stored in memory 530. The processing circuitry 510 in this regard may implement certain functional means or units.

FIG. 7B in this regard illustrates additional details of a transmit radio node 12, 32 in accordance with one or more other embodiments, shown generally as transmit radio node 500B. Specifically, the transmit radio node 500B may include a transmit module or unit 540 for performing the transmitting in FIGS. 2 and/or 5, and may include a receive module or unit 550 for performing the receiving in FIGS. 2 and/or 5. The transmit radio node 500B may also or alternatively include other modules for performing other processing herein. One or more of these modules or units may be implemented by the processing circuitry 510 in FIG. 7A.

Similarly, note that a receive radio node 14, 34 may perform the processing herein by implementing any functional means or units. In one embodiment, for example, the receive radio node 14, 34 comprises respective circuits configured to perform processing herein, e.g., the steps shown in any of FIGS. 3 and 6. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein.

Figure 8B:
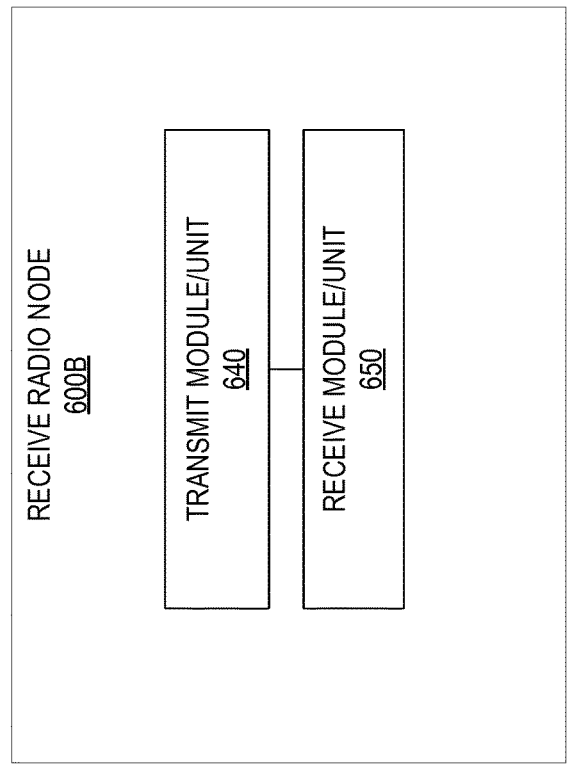
FIG. 8B is a block diagram of a receive radio node according to some embodiments.
Figure 8A:
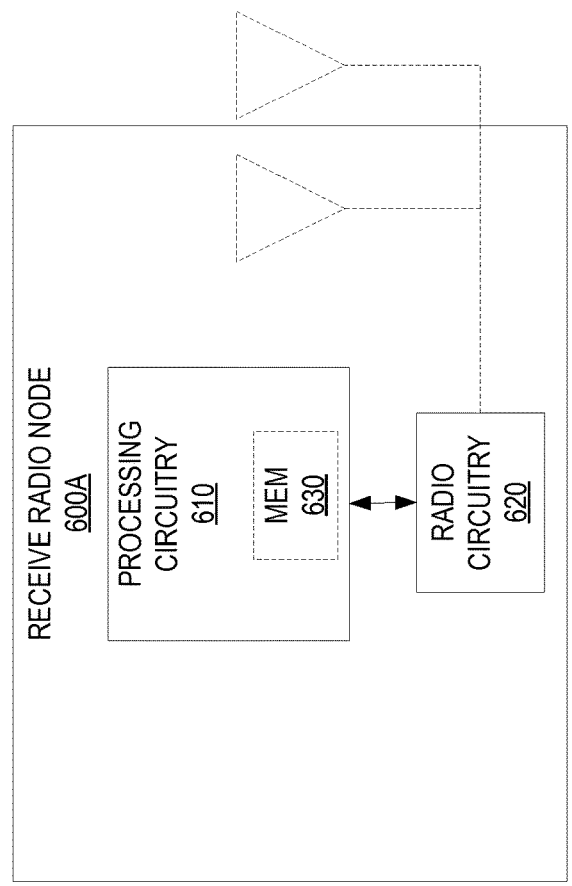
FIG. 8A is a block diagram of a receive radio node according to some embodiments.

FIG. 8A illustrates additional details of a receive radio node 14, 34 in accordance with one or more embodiments, shown generally as receive radio node 600A. As shown, the receive radio node 600A includes processing circuitry 610 and radio circuitry 620. The radio circuitry 620 may be configured to transmit and/or receive via one or more antennas that are internal and/or external to the receive radio node 600A. The processing circuitry 610 is configured to perform processing described above, e.g., in FIGS. 3 and/or 6, such as by executing instructions stored in memory 630. The processing circuitry 610 in this regard may implement certain functional means or units.

FIG. 8B in this regard illustrates additional details of a receive radio node 14, 34 in accordance with one or more other embodiments, shown generally as receive radio node 600B. Specifically, the receive radio node 600B may include a transmit module or unit 640 for performing the transmitting in FIGS. 3 and/or 6, and may include a receive module or unit 550 for performing the receiving in FIGS. 3 and/or 6. The receive radio node 600B may also or alternatively include other modules for performing other processing herein. One or more of these modules or units may be implemented by the processing circuitry 610 in FIG. 8A.

Those skilled in the art will also appreciate that embodiments herein further include corresponding computer programs.

A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

Additional embodiments herein will now be described. These additional embodiments may further elaborate and exemplify various embodiments above, such that they are combinable with the above embodiments. Other aspects of the additional embodiments may be implemented separate and apart from the above embodiments.

A retransmission will typically contain only a few erroneous CBGs and not all CBGs of the original transmission. The mapping of HARQ feedback bits to retransmitted CBGs may be specified by some embodiments herein. Note in this regard that some embodiments recognize that the HARQ feedback bits are not efficiently utilized if the number of CBGs is lower than the number of HARQ feedback bits.

Figure 9:
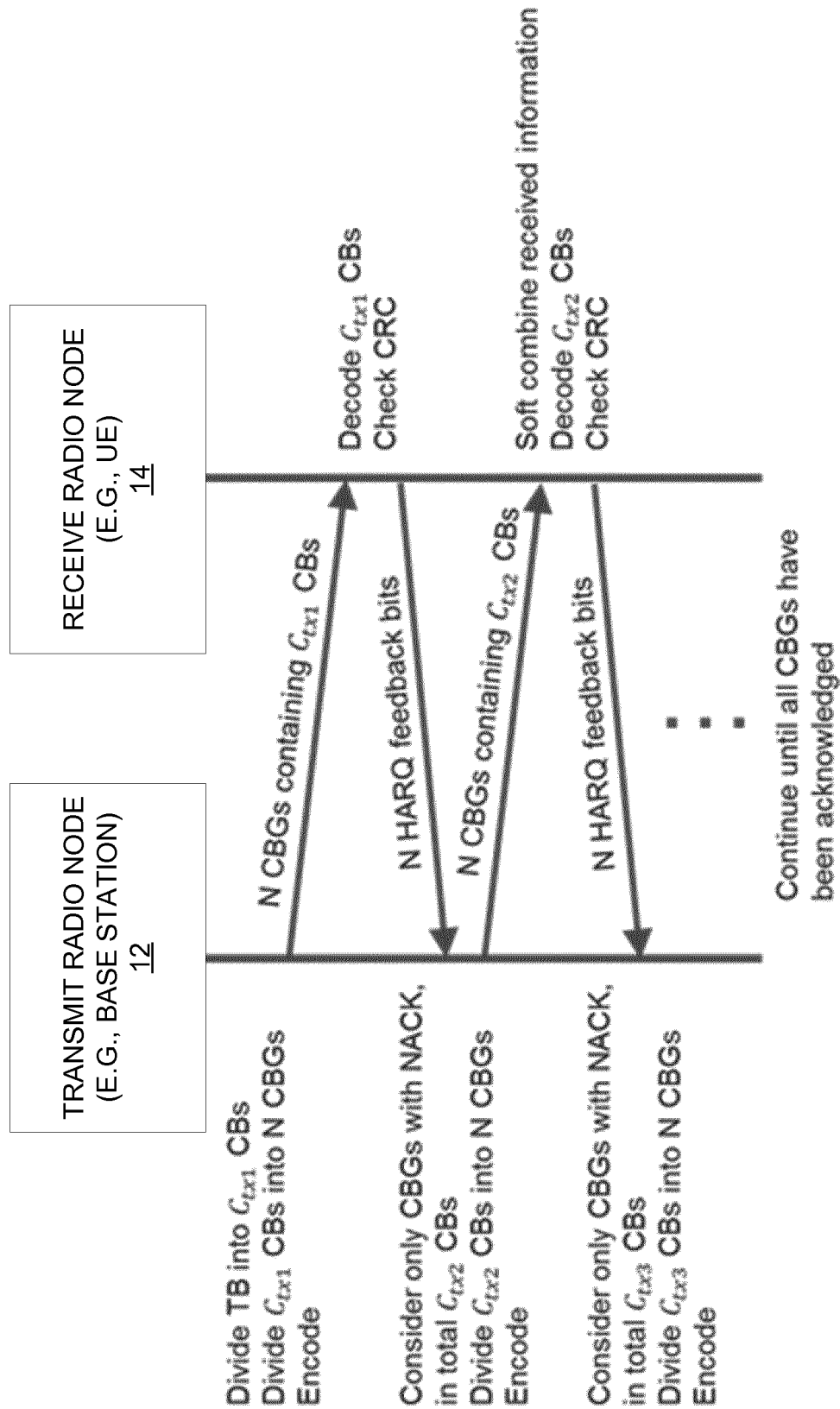
FIG. 9 is a call flow diagram of some embodiments that use dynamic code block groups for retransmissions.

Some embodiments include a HARQ procedure with CB re-allocation to CBG. In particular, FIG. 9 shows a diagram that describes some embodiments with dynamic code block groups for retransmissions. As shown, the transmit radio node 12 divides a TB into $C_{tx1}$ code blocks (CBs), which may be evenly distributed over the N CBGs as much as possible. The transmit radio node 12 divides these $C_{tx1}$ CBs into N code block groups (CBGs) and performs encoding. The transmit radio node 12 then transmits to the receive radio node 14 the N CBGs that contain the $C_{tx1}$ CBs.

The receive radio node 14 decodes the $C_{tx1}$ CBs and performs CRC checking. After the receive radio node 14 has decoded the $C_{tx1}$ CBs of the first transmission and performed CRC checking, the receive radio node 14 sends back to the transmit radio node 12 N HARQ feedback bits. In some embodiments, the N HARQ feedback bits includes one bit per CBG for each transport block received. When carrier aggregation and/or multi-layer multiple-input multiple-output (MIMO) is used, there can be multiple transport blocks transmitted per transmission time interval (TTI).

In some embodiments, the number of CBGs (N) is the same as the number of HARQ feedback bits (N). In some embodiments, N is a fixed value, e.g., predefined in the 3GPP specifications. Alternatively, N in other embodiments is configured by a broadcast message or UE-specific message; that is, N is configured via radio resource control (RRC) signaling (broadcast or UE-specific RRC signaling), after which N is assumed to be fixed until further (re-)configuration.

In any event, when the transmit radio node 12 receives the feedback, the transmit radio node 12 in some embodiments retransmits the CBs belonging to the CBGs with NACK, e.g., considering only CBGs with NACK. The number of CBs belonging to CBGs with NACK, which should be retransmitted, is denoted by $C_{tx2}$. The transmit radio node 12 may divide the $C_{tx2}$ CBs into N CBGs. The division/allocation of the $C_{tx2}$ CBs into CBGs for the retransmission may be different than the division/allocation of the $C_{tx1}$ CBs into CBGs for the previous transmission. That is, the CBs are dynamically re-allocated to CBGs across different (re)transmissions of the CBs for the TB.

For example, in a typical scenario, the TB may be large and contain a large number of CBs. One example is given below to illustrate. For example, a TB contains $C_{tx1}$=100 CBs. These 100 CBs may be divided into N=10 CBGs. If a single CB is not successfully decoded, this means that $$\frac{C_{tx1}}{N} = \frac{100}{10} = 10$$

CBs must be retransmitted. When the retransmission is performed, one way would be to keep the allocation of CBs to CBGs and retransmit only one CBG containing the 10 CBs. This means however that only one of the N feedback bits has a meaning, while the other bits must still be transmitted but are known before hand to correspond to ACKs.

With dynamic re-allocation of CBs to CBGs, the 10 CBs in the CBG for which the transmitter received a NACK may be allocated to a separate CBG each. The N feedback bits of the retransmission thus correspond to single CBs. If a CB is still not correctly decoded, only retransmission of the erroneous CBs is needed in the second retransmission.

It should be noted that the allocation of CBs to CBGs does not have to be signaled between the transmit radio node 12 and the receive radio node 14. The allocation algorithm may be fixed in some embodiments so that the allocation of CBs to CBGs is completely determined by the number of CBs in the transmission and the configured number of CBGs.

Note that the transmit radio node 12 in some embodiments retransmits a CB as used herein, not by retransmitting the exact same coded bits of the CB that were transmitted in the previous transmission, but by performing retransmission in the incremental redundancy sense, where some combination of previously transmitted and/or un-transmitted coded bits are transmitted.

In some embodiments, soft combining is performed before decoding of any retransmission, as shown in FIG. 9. Soft combining can be performed for data which is the same in both transmissions. By attaching CRC bits to each CB, instead of each CBG, it is ensured that both data and CRC bits and thereby also the coded bits of each codeword remains the same also when CBs are re-allocated to other CBGs before retransmission. This means that soft information for all bits can be combined with the soft information from the retransmission. In the case where CRC bits are calculated from a CBG and attached to one or several CBs, the value of the CRC bits as well as the parity bits of one or several CBs will change if the allocation of CBs to this CBG changes.

Alternatively or additionally, decoding of the retransmitted CBs in some embodiments is only performed for the CBs that were not successfully decoded or had CRCs that did not check. It is only if a CB that was assumed to be correctly decoded actually has an undetected error that soft combining with information received in previous transmission attempts may make a difference. However, the probability of undetected CB errors is very low if a CRC is attached to each CB.

It should be noted that the method described herein in some embodiments may rely on the receive radio node 13 to know which CBs are retransmitted. One alternative is to rely on the HARQ feedback from the receive radio node 14 to the transmit radio node 12 and to retransmit CBGs whose received HARQ bits are NACKs. In some cases, the transmit radio node 12 can detect that the HARQ feedback is unreliable, for example through checking a CRC that might be attached to the HARQ feedback bits, or through checking a threshold for detecting discontinuous transmission (DTX). In these cases, the previous allocation of CBs to CBGs may be used to make sure that the transmit radio node 12 and the receive radio node 14 has the same understanding of which CBs have been transmitted. Another alternative is that all CBGs are retransmitted and the transmit radio node 12 signals this in the downlink control information (DCI), for example through setting the redundancy version (RV) to 0, or having a specific bit or counter to indicate this.

Another alternative is to signal which CBGs that are retransmitted in for example the retransmission DCI. As an example, this can be signalled through a bitmap indicating exactly which CBGs are retransmitted. The bitmap sent in the DCI which schedules transmission k corresponds to the allocation of CBs to CBGs used in transmission (k−1). If errors occur in the HARQ feedback transmission, the receive radio node 13 will anyhow know which CBs the retransmission contains. In some embodiments, then, a counter field of one or more bits is added to the DCI which is incremented each time the allocation of CBs to CBGs is changed. In other embodiments, a bit is used to reset the allocation of CBs to CBGs to the original one if the transmit radio node 12 (e.g., gNB) thinks that the receive radio node 14 (e.g., UE) and transmit radio node 12 have different understanding of the allocation.

In the second alternative, where a bitmap is sent indicating which CBG(s) are retransmitted, the receive radio node 14 (e.g., UE) may sometimes determine that the HARQ feedback it sent was incorrectly received at the transmit radio node 12 (e.g., gNB). It can typically be assumed that the DCI is received correctly. Various embodiments are given in which the receive radio node 14 may indicate this to the transmit radio node 12.

In one embodiment, the receive radio node 14 sends no HARQ feedback for the current transmission, for example because the downlink control information (DCI) was not correctly received. In this embodiment, then, the transmit radio node 12 detects that the receive radio node 14 sends no feedback, either through a CRC, or through a threshold comparison. The transmit radio node 12 can then retransmit all CBs of the previous transmission.

Another embodiment reserves one bit in the HARQ feedback to indicate that the wrong CBGs have been retransmitted. There are two possible variants of this. In one variant, one bit is used to indicate retransmission of wrong CBGs, and the other N−1 bits are used for reallocation of CBs to CBGs. In another variant, N+1 bits in total are used for HARQ feedback. If the bit indicating retransmission of wrong CBGs is set, the other bits indicate HARQ feedback for the CBGs according to the allocation of CBs to CBGs of the previous transmission. If the bit is not set, the other bits indicate HARQ feedback for CBGs according to the new allocation as above.

Some embodiments are described for the case where one transmission contains only one TB. It should however be understood that it is equally well applicable to the case where a transmission contains more than one TB. In this case, all DCI signaling can be performed on each TB independently.

Some embodiments are described assuming that each CB has CRC bits attached, but this is not strictly necessary. If CRC is attached to a set of $C_0$ CBs instead, dynamic CRC allocation is still possible if each CBG contains more than $C_0$ CBs. The drawback is that the smallest possible CBG will contain $C_0$ CBs, but there is less CRC overhead in the data transmissions.

The description above has mostly assumed the case that the number of HARQ bits to feedback is the same for each transmission. However, the reallocation of CBs to different CBGs still works if this is not the case. For example, the number of HARQ bits to feed back after transmission k may be signaled in the DCI that scheduled transmission k.

Another example is that the number of HARQ bits to feed back for transmission k is a function of the number of CBs that were transmitted in transmission k, or the total number of information bits transmitted in transmission k.

Some embodiments include DCI to support CB re-allocation to CBGs. It is assumed here that the transmit radio node 12 always allocates CBs to CBGs according to a predetermined allocation algorithm, similar to how bits are allocated to CBs in LTE, that is known in both the transmitter and the receiver. The allocation algorithm may take the size of the transmission and the number of CBGs into account. That is, in the first transmission, the allocation of CBs to CBGs is completely determined by the preconfigured N and the TB size. The TB size is known to the receive radio node 14 as well, after decoding of the DCI, and the receive radio node 14 therefore knows the exact allocation of CBs to CBGs.

Consider now the relation between HARQ-ACK feedback and CBs. When the transmit radio node 12 receives the HARQ-ACK feedback, it should always be interpreted based on the most recent transmission and allocation of CBs to CBGs. An example is provided to illustrate how the HARQ-ACK feedback should be interpreted.

In the example, for DL transmission, a TB contains $C_{tx1}$=100 CBs. These 100 CBs may be divided into N=5 CBGs, with each CBG containing 20 CBs. That is, i.e., TB=5 CBGs=100 CBs. In the $1^{st}$ transmission of the given TB, the physical downlink shared channel (PDSCH) containing the full TB is sent by the gNB (as the transmit radio node 12). Assume that the UE (as the receive radio node 14) successfully receives CBG {#0, #1, #3}, and fails to receive CBG {#2,#4}. Thus, the UE sends back HARQ acknowledgment of 5-bit vector HARQ-ACK1=[1 1 0 1 0] to the gNB via uplink control information (UCI), one bit per CBG, with '1' indicating successful reception, '0' indicating failed reception.

In the $2^{nd}$ transmission of the same TB, the gNB retransmits CBG {#2, #4}, which contains CB #40-CB #59 and CB #80-CB #99. If there is a bitmap in the DCI to indicate which CBGs are retransmitted, this is set to [0 0 1 0 1]. When calculating HARQ feedback for the $2^{nd}$ transmission, the UE calculates a new allocation of CBs to CBGs. In the case of 5 CBGs also in the $2^{nd}$ transmission, each CBG may contain 8 of the 40 retransmitted CBs. Assume that CB #41 and #99 were incorrectly decoded. Since these belong to CBG #0 and #4 in the new allocation, the UE sends the vector [0 1 1 1 0] as HARQ-ACK feedback.

In the $3^{rd}$ transmission, the gNB retransmits CB #40-#47 and #92499, since these were the CBs belonging to the CBG for which the gNB received NACK as HARQ feedback. If there is a bitmap in the DCI to indicate which CBGs are retransmitted, this is set to [1 0 0 0 1] to indicate that CBG #0 and CBG #4 in the new allocation is retransmitted.

If the CBG allocation does not dynamically change between retransmissions, the UE would have to feed back NACK for all CBs in the $2^{nd}$ transmission, and the gNB would then need to retransmit all of the CBs #40-#59, and CB #80-#99 also in the $3^{rd}$ transmission. By reallocating CBs to smaller CBGs, the 3rd transmissions contains fewer CBs.

Consider now an example shown in FIG. 10A where the UE detects that the HARQ feedback is in error. As shown, the gNB detects that the HARQ feedback from transmission 1 is faulty, either through CRC or through a threshold detection. Accordingly, the gNB retransmits all CBGs.

FIG. 10B shows another example where the gNB detects that no HARQ feedback was sent (DTX). In this example, there is a counter field of one bit that is incremented each time the CBG allocation is changed. Here, the gNB detects that the HARQ feedback from transmission 1 was in DTX, and resends the same CBs as in transmission 1. To ensure that the UE does not think that the DCI bitmap corresponds to its HARQ feedback from transmission 1, the allocation counter field is not incremented.

There is however a case where it might be beneficial to go to fewer bits instead of increasing the granularity. If the larger number of feedback bits requires the use of a physical uplink control channel (PUCCH) format designed for high payloads, but small multiplexing capability, and the lower number of feedback bits can be sent over a PUCCH format that can only carry fewer bits but allows for more multiplexing, it might instead be better to switch PUCCH formats instead of making the granularity finer. A simple rule for determining this in some embodiments is formulated as follows.

Let the number of retransmitted CBGs be N_rtx. Let {N_PUCCH_i} be the set payload sizes of different PUCCH formats available for HARQ feedback. The number of HARQ bits to use for feedback should be the smallest N_PUCCH_i such that N_PUCCH_i is greater than or equal to N_rtx. Then reallocation of CB to N_PUCCH_i is done to different CBGs.

A codeword herein is a coded transport block that has been segmented into one or more code blocks to which channel coding is separately applied.

In view of the above, some embodiments include a method in a wireless transmitter. The method comprises receiving one or several HARQ feedback bits from a receiver, determining which code block groups and thereby which code blocks should be retransmitted, and allocating the retransmission code blocks to one or several code block groups, where the allocation may be different compared to the first transmission or a previous retransmission.

In some embodiments, CRC bits are attached to each code block.

Alternatively or additionally, the HARQ feedback received from the receiver contains as many bits as the number of code block groups in the transmission. In one embodiment, for example, the HARQ feedback is a bitmap of the code block groups that gives an ACK/NACK per code block group.

In some embodiments, only the code blocks for which decoding failed or that did not pass the CRC check are decoded again.

According to still other embodiments, HARQ feedback is sent on CBG level, where a CBG may include from a single CB up to all CBs of a TB. Some embodiments propose two-level CRC attachment for NR data channel. The TB is first appended with a CRC sequence of length $L_{TB}$ computed from the bits in the TB. After code block segmentation, each CB is appended with a CRC sequence of length $L_{CB}$ or each CBG is appended with a CRC sequence of length $L_{cBG}$.

By appending a CRC sequence to each CB, some embodiments avoid unnecessary buffering and processing lockup in the receiver parallelization. If a CRC sequence is instead computed from the bits in a CBG, all bits in the CBG must be buffered before the CRC may be evaluated. However, because of the inherent error detection capability of the low density parity check (LDPC) codes, some embodiments have error detection on CB level already. The inherent error detection capability of short LDPC codes increases with increasing LDPC information block length. Since code block segmentation into several CBs that may be grouped into a CBG is only performed if the TB is larger than 8192, the inherent error detection capability of long LDPC codes should be considered when comparing CRC attachment on CB versus CBG level. Further, CB grouping where each CBG is composed of more than one CB is not expected to be applicable unless the TB is composed of a large number of CBs (e.g., 10 CBs or more). For such large TBs, code block segmentation will produce CBs of size around $K_{CB}\sim=8192$. Hence $K_{CB}\sim=8192$ should be considered comparing CRC attachment on CB versus CBG level.

The functionality of CB-level CRC in LTE is early termination of turbo decoding of a TB, i.e., when an earlier CB is in error, then decoding of all remaining CBs is skipped, and NACK of the TB is generated directly. This feature is still useful for the NR data channel, where LDPC codes will be used. For CB grouping in NR, if an earlier CB of a given CBG is in error and deemed un-recoverable, then a NACK can be generated for the CBG. The remaining CBs in the CBG do not need to be decoded.

According to some embodiments, CBG-level CRC is not necessary.

Some embodiments recognize that CRC attachment on the CB level with L bits achieves the same or lower probability of undetected CBG error as CRC attachment on CBG level with L bits. Additionally or alternatively, some embodiments recognize that CRC overhead is low when CRC bits are attached to large CBs, which is the case when code block segmentation is performed.

In still other embodiments, for NR, the HARQ feedback may consist of a bit pattern with the same number of bits as the number of CBGs, that exactly points out the CBGs that could not be correctly decoded by the receiver. Only the erroneous CBGs are retransmitted in some embodiments. To utilize the provisioned HARQ feedback bits in a good way, it may be advantageous to reallocate CBs to new CBGs for the retransmission, so that the number of CBGs is again the same as the number of bits provisioned for the HARQ feedback.

However, if a CB belongs to one CBG in the first transmission and to another CBG, with another CRC attached, in the retransmission, the CRC bits cannot be soft combined. It is therefore advantageous to attach CRC bits to each CB instead of each CBG. In some embodiments, then, for the NR data channel, CRC sequences are appended both to each TB and to each CB.

The invention claimed is:

1. A transmit radio node configured for use in a wireless communication system, the transmit radio node comprising radio circuitry and processing circuitry wherein the transmit radio node is configured to:
   transmit one or more code blocks, CBs, of a transport block to a receive radio node;
   receive feedback from the receive radio node that positively or negatively acknowledges each of one or more first code block groups, CBGs, into which the one or more transmitted CBs are allocated according to a first CB-to-CBG allocation;
   re-transmit to the receive radio node any CBs that the first CB-to-CBG allocation allocates to one or more first CBGs which the feedback negatively acknowledged; and
   receive feedback from the receive radio node that positively or negatively acknowledges each of one or more second CBGs into which the re-transmitted CBs are allocated according to a second CB-to-CBG allocation, wherein the first and second CB-to-CBG allocations are different.

2. The transmit radio node of claim 1, wherein the second CB-to-CBG allocation allocates fewer CBs to the second CBGs than the first CB-to-CBG allocation allocates to the first CBGs.

3. The transmit radio node of claim 1, wherein the feedback that positively or negatively acknowledges each of one or more first CBGs includes a number of acknowledgement bits that is equal to a number of first CBGs to be positively or negatively acknowledged by that feedback, and wherein the feedback that positively or negatively acknowledges each of one or more second CBGs includes a number of acknowledgement bits that is equal to a number of second CBGs to be positively or negatively acknowledged by that feedback.

4. The transmit radio node of claim 1, comprising radio circuitry and processing circuitry wherein the transmit radio node is configured to:
  attach a cyclic redundancy check, CRC, to each CB; or
  attach a cyclic redundancy check, CRC, to each set of multiple CBs, wherein the first or second CB-to-CBG allocation allocates more CBs to a first or second CBG than a number of CBs included in each set of CBs.

5. The transmit radio node of claim 1, comprising radio circuitry and processing circuitry wherein the transmit radio node is configured to transmit signaling to the receive radio node indicating according to which CB-to-CBG allocation CBs are to be, or are expected to be, allocated to CBGs.

6. The transmit radio node of claim 1, comprising radio circuitry and processing circuitry wherein the transmit radio node is configured to revert to a previously used CB-to-CBG allocation according to which CBs are to be, or are expected to be, allocated to CBGs, responsive to deeming received feedback from the receive radio node unreliable.

7. The transmit radio node of claim 1, comprising radio circuitry and processing circuitry wherein the transmit radio node is configured to transmit signaling indicating into which of the one or more first CBGs the re-transmitted CBs are allocated according to the first CB-to-CBG allocation.

8. The transmit radio node of any of claim 7, wherein the signaling includes one or more bits, with each bit indicating whether any of the re-transmitted CBs are allocated into a respective one of the first CBGs according to the first CB-to-CBG allocation.

9. A receive radio node configured for use in a wireless communication system, the receive radio node comprising radio circuitry and processing circuitry wherein the receive radio node is configured to:
  receive one or more code blocks, CBs, of a transport block from a transmit radio node;
  transmit feedback to the transmit radio node that positively or negatively acknowledges each of one or more first code block groups, CBGs, into which the one or more transmitted CBs are allocated according to a first CB-to-CBG allocation;
  receive from the transmit radio node re-transmission of any CBs that the first CB-to-CBG allocation allocates to one or more first CBGs which the feedback negatively acknowledged; and
  transmit feedback to the transmit radio node that positively or negatively acknowledges each of one or more second CBGs into which the re-transmitted CBs are allocated according to a second CB-to-CBG allocation, wherein the first and second CB-to-CBG allocations are different.

10. The receive radio node of claim 9, wherein the second CB-to-CBG allocation allocates fewer CBs to the second CBGs than the first CB-to-CBG allocation allocates to the first CBGs.

11. The receive radio node of claim 9, wherein the feedback that positively or negatively acknowledges each of one or more first CBGs includes a number of acknowledgement bits that is equal to a number of first CBGs to be positively or negatively acknowledged by that feedback, and wherein the feedback that positively or negatively acknowledges each of one or more second CBGs includes a number of acknowledgement bits that is equal to a number of second CBGs to be positively or negatively acknowledged by that feedback.

12. The receive radio node of claim 9, comprising radio circuitry and processing circuitry wherein the receive radio node is configured to:
  detect whether each CB is received in error using a cyclic redundancy check, CRC, attached to each CB; or
  detect whether each set of multiple CBs is received in error using a cyclic redundancy check, CRC, attached to each set of multiple CBs, wherein the first or second CB-to-CBG allocation allocates more CBs to a first or second CBG than a number of CBs included in each set of CBs.

13. The receive radio node of claim 9, comprising radio circuitry and processing circuitry wherein the receive radio node is configured to receive from the transmit radio node signaling indicating according to which CB-to-CBG allocation CBs are to be, or are expected to be, allocated to CBGs.

14. The receive radio node of claim 9, comprising radio circuitry and processing circuitry wherein the receive radio node is configured to revert to a previously used CB-to-CBG allocation according to which CBs are to be, or are expected to be, allocated to CBGs, responsive to determining that the transmit radio node did not correctly receive feedback from the receive radio node.

15. The receive radio node of claim 9, comprising radio circuitry and processing circuitry wherein the receive radio node is configured to receive signaling indicating into which of the one or more first CBGs the re-transmitted CB s are allocated according to the first CB-to-CBG allocation.

16. The receive radio node of claim 15, wherein the signaling includes one or more bits, with each bit indicating whether any of the re-transmitted CB s are allocated into a respective one of the first CBGs according to the first CB-to-CBG allocation.

17. The receive radio node of claim 9, comprising radio circuitry and processing circuitry wherein the receive radio node is configured to, before decoding the re-transmitted CBs, combine information from the one or more received CBs with information from the re-transmitted CBs.

18. The receive radio node of claim 9, comprising radio circuitry and processing circuitry wherein the receive radio node is configured to decode only those of the re-transmitted CBs that prompted negative acknowledgement of one or more of the first CBGs.

19. A method performed by a transmit radio node configured for use in a wireless communication system, the method comprising:
  transmitting one or more code blocks, CBs, of a transport block to a receive radio node;
  receiving feedback from the receive radio node that positively or negatively acknowledges each of one or more first code block groups, CBGs, into which the one or more transmitted CBs are allocated according to a first CB-to-CBG allocation;

re-transmitting to the receive radio node any CBs that the first CB-to-CBG allocation allocates to one or more first CBGs which the feedback negatively acknowledged; and receiving feedback from the receive radio node that positively or negatively acknowledges each of one or more second CBGs into which the re-transmitted CBs are allocated according to a second CB-to-CBG allocation, wherein the first and second CB-to-CBG allocations are different.

20. A method performed by a receive radio node configured for use in a wireless communication system, the method comprising:

receiving one or more code blocks, CBs, of a transport block from a transmit radio node;

transmitting feedback to the transmit radio node that positively or negatively acknowledges each of one or more first code block groups, CBGs, into which the one or more transmitted CBs are allocated according to a first CB-to-CBG allocation;

receiving from the transmit radio node re-transmission of any CBs that the first CB-to-CBG allocation allocates to one or more first CBGs which the feedback negatively acknowledged; and transmitting feedback to the transmit radio node that positively or negatively acknowledges each of one or more second CBGs into which the re-transmitted CBs are allocated according to a second CB-to-CBG allocation, wherein the first and second CB-to-CBG allocations are different.

* * * * *